US008533422B2

(12) United States Patent
Subramaniam et al.

(10) Patent No.: US 8,533,422 B2
(45) Date of Patent: Sep. 10, 2013

(54) INSTRUCTION PREFETCHING USING CACHE LINE HISTORY

(75) Inventors: Samantika Subramaniam, Westford, MA (US); Aamer Jaleel, Cambridge, MA (US); Simon C. Steely, Jr., Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 12/895,387

(22) Filed: Sep. 30, 2010

(65) Prior Publication Data

US 2012/0084497 A1    Apr. 5, 2012

(51) Int. Cl.
*G06F 12/06* (2006.01)
*G06F 12/08* (2006.01)

(52) U.S. Cl.
USPC .... 711/173; 711/105; 711/123; 711/E12.078; 711/E12.024

(58) Field of Classification Search
USPC .......... 711/173, 105, 123, E12.024, E12.078
See application file for complete search history.

(56) References Cited

U.S. PATENT DOCUMENTS

| | | | |
|---|---|---|---|
| 5,442,756 A | 8/1995 | Grochowski et al. | |
| 5,584,001 A | 12/1996 | Hoyt et al. | |
| 5,815,700 A | 9/1998 | Poplingher et al. | |
| 5,819,079 A | 10/1998 | Glew et al. | |
| 5,859,994 A | 1/1999 | Zaidi | |
| 5,918,046 A | 6/1999 | Hoyt et al. | |
| 6,035,393 A | 3/2000 | Glew et al. | |
| 6,079,014 A | 6/2000 | Papworth et al. | |
| 6,732,260 B1 | 5/2004 | Wang et al. | |
| 7,069,426 B1 | 6/2006 | Hummel | |
| 7,516,312 B2 | 4/2009 | Wang et al. | |
| 2008/0034187 A1* | 2/2008 | Stempel et al. | 712/205 |

OTHER PUBLICATIONS

Spracklen, Lawrence, et al., "Effective Instruction Prefetching in Chip Multiprocessors for Modern Commercial Applications", Proceedings of the 11th Int'l Symposium on High-Performance Computer Architecture (HPCA-11 2005) Scalable Systems Group. Sun Microsystems. (C) 2005 IEEE, 12 pages.
Yeh, Tse-Yu, et al., "Two-Level Adaptive Training Branch Prediction", Department of Electrical Engineering and Computer Science, The University of Michigan. Originally published in the Proc. 24th Ann. Int'l Symp. Microarchitecture, 1991. (C) 1991. pp. 51-61.

* cited by examiner

*Primary Examiner* — Yong Choe
(74) *Attorney, Agent, or Firm* — Blakely, Sokoloff, Taylor & Zafman LLP (57) ABSTRACT

An apparatus of an aspect includes a prefetch cache line address predictor to receive a cache line address and to predict a next cache line address to be prefetched. The next cache line address may indicate a cache line having at least 64-bytes of instructions. The prefetch cache line address predictor may have a cache line target history storage to store a cache line target history for each of multiple most recent corresponding cache lines. Each cache line target history may indicate whether the corresponding cache line had a sequential cache line target or a non-sequential cache line target. The cache line address predictor may also have a cache line target history predictor. The cache line target history predictor may predict whether the next cache line address is a sequential cache line address or a non-sequential cache line address, based on the cache line target history for the most recent cache lines.

16 Claims, 6 Drawing Sheets

INSTRUCTION PREFETCHING USING CACHE LINE HISTORY

BACKGROUND

1. Field

Various different embodiments relate to methods, apparatus, or systems for prefetching instructions. In particular, various different embodiments relate to methods, apparatus, or systems for prefetching instructions using cache line history.

2. Background Information

Processors and other instruction processing apparatus commonly perform instruction prefetching in order to help increase performance. Processor speed (e.g., the speed of execution of instructions by the processor) typically is significantly faster than the speed of the memory subsystem (e.g., the speed of accessing instructions from memory). Instruction prefetching may involve speculatively fetching or otherwise accessing instructions from memory before the processor requests the instructions for execution. The prefetched instructions may be stored in a processor cache until they are ready to be executed. When the prefetched instructions ready to be executed, the instructions may be accessed from the cache, more rapidly than they could have been accessed from memory. However, if the instructions were not prefetched and were not available in the instruction cache (e.g. an instruction cache miss), the execution logic of the processor may need to wait for the instructions to be accessed from main memory, which may take a significant amount of time. This may tend to significantly reduce the overall throughput of the processor. This tends to be especially significant for instruction working sets that do not fit in the processor cache(s). Accordingly, the prefetching of the instructions may help to improve performance by reducing the amount of time the execution logic of the processor needs to wait for instructions for it to execute.

Instructions are not always processed sequentially one after the other. Certain types of instructions, such as branch instructions, jump instructions, function calls, traps, and other types of control flow transfer instructions, may cause processing to branch, jump, or otherwise move around in the instruction sequence or control flow. For example, the processor may process a group of instructions sequentially until a control flow transfer instruction (e.g., a branch instruction) is encountered, and then the control flow transfer instruction may cause the processor to jump or branch to a target instruction at another non-sequential or discontinuous location in the instruction sequence (e.g., the target instruction may be separated from the control flow transfer instruction by one or more or potentially many intervening instructions).

In some cases, the number of intervening instructions between the target instruction and the control flow transfer instruction may be relatively small (e.g., in the case of a so-called short control flow transfer instruction), in which case the target instruction may potentially be within the same cache line as the control flow transfer instruction or in a subsequent cache line. However, in other cases, the number of intervening instructions between the target instruction and the control flow transfer instruction may alternatively be sufficiently larger (e.g., in the case of a so-called long control flow transfer instruction), in which case the target instruction may be in a non-sequential cache line relative to the cache line of the control flow transfer instruction (e.g., separated by one or more or potentially many intervening cache lines). As used herein the cache line that has a target instruction of an instruction of a given cache line may be referred to as a target cache line.

As a result, instruction prefetching may involve not only sequential prefetching of cache lines (e.g., prefetch line L and then prefetch subsequent line L+1) but also non-sequential prefetching of cache lines (e.g., prefetch line L and the prefetch line L+N, where N≠1).

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
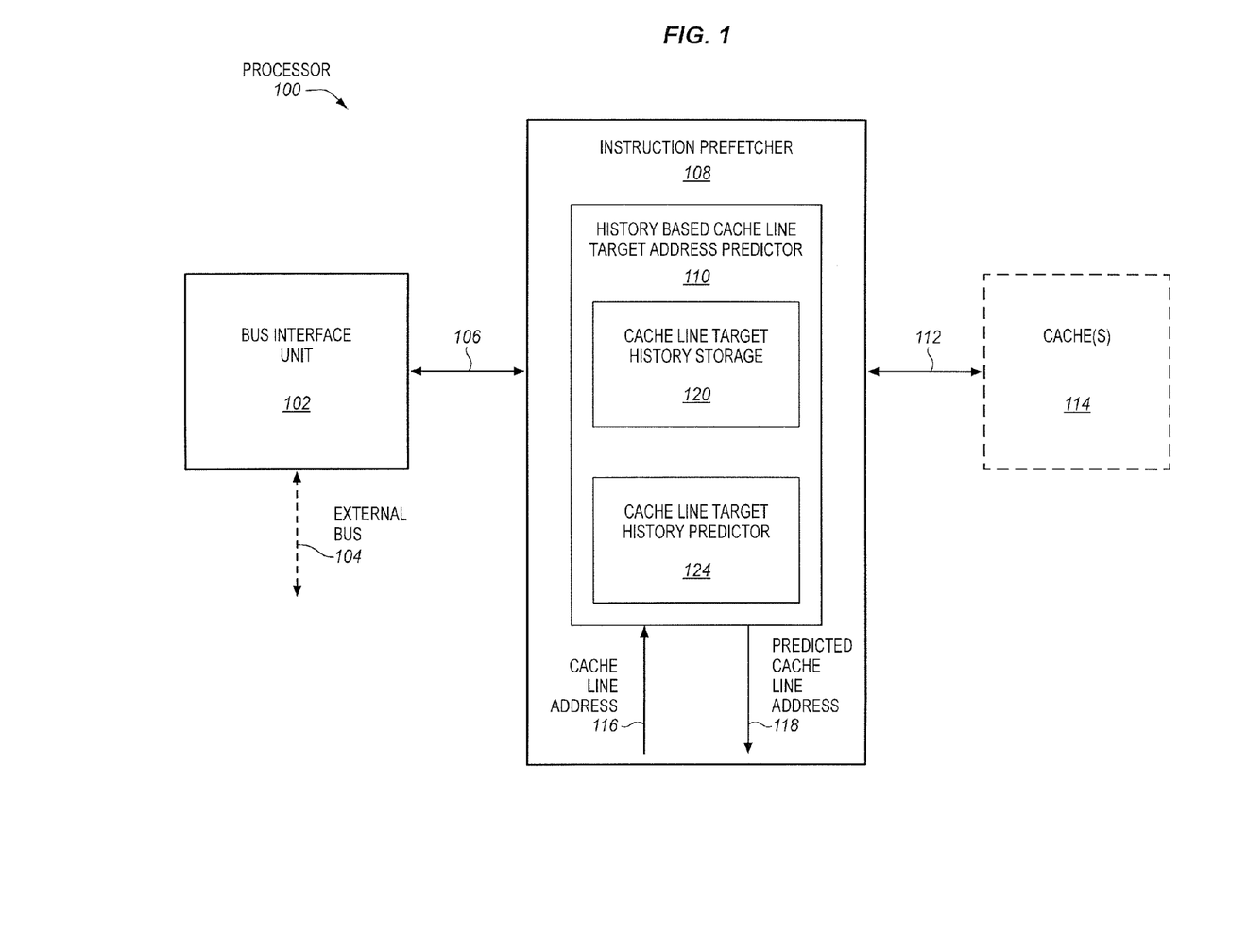
FIG. 1 is a block diagram of an embodiment of a processor that includes an instruction prefetcher having an embodiment of a cache line target address predictor.

FIG. 1 is a block diagram of an embodiment of a processor 100 that includes an instruction prefetcher 108 having an embodiment of a cache line target address predictor 110. The processor is one example of an instruction processing apparatus that may incorporate the cache line target address predictor 110.

In one or more embodiments, the processor may be a general-purpose processor, such as, for example, one of the general-purpose processors manufactured by Intel Corporation, of Santa Clara, Calif., although this is not required. A few representative examples of suitable general-purpose processors available from Intel Corporation include, but are not limited to, Intel® Atom™ Processors, Intel® Core™ processors, Intel® Core™ i7 processors, Intel® Core™ i5 processors, Intel® Core™2 processors, Intel® Pentium® processors, Intel® Celeron® processors, and Intel® Xeon® processors.

Alternatively, the processor may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. In still other embodiments, the processor or instruction processing apparatus may represent a controller (e.g., a microcontroller), or other type of logic circuit capable of processing instructions.

Referring again to FIG. 1, in addition to the instruction prefetcher 108, the processor 100 also includes one or more caches 114 and a bus interface unit 102. The instruction prefetcher is coupled with the one or more caches by a first bus 112 and the instruction prefetcher is coupled with the bus interface unit by a second bus 106. The first and second buses are internal buses. When employed in a system, the bus interface unit is capable of being coupled with an external bus 104, such as, for example, a front side bus on a motherboard. The bus interface unit may provide an interface to the external bus 104 and may include at least some hardware (e.g., circuitry). During use in the system, the instruction prefetcher may prefetch instructions from memory (not shown) via the second bus 106, the bus interface unit, and the external bus 104. The prefetched instructions may be provided to the one or more caches via the first bus 112 and stored therein. In one aspect, the one or more caches include an instruction cache (e.g., a first level cache closest to an execution core) which may or may not also have data. Alternatively, the prefetched instructions may be stored in a prefetch buffer.

The instruction prefetcher has, or alternatively is coupled with, an example embodiment of a history based cache line target address predictor 110. The history based cache line target address predictor is operable to receive a cache line address 116 and to predict a next cache line address 118 to be prefetched. The prediction of the next cache line address to be prefetched may utilize the aspect that the instruction flow is predictable, and the cache line targets corresponding to that instruction flow is also predictable.

In one embodiment, the next cache line address may indicate a cache line having at least 64-bytes of instructions. Instruction prefetching may be performed at different granularities. So called fetch-line instruction prefetchers use fetch line granularity, which is typically 16 bytes worth of instructions. In contrast, in one embodiment, the instruction prefetcher and predictor may operate at cache-line granularity, which may include 64 bytes or more worth of instructions. The coarser granularity may help to avoid the need to track short control-flow changes that may occur within a cache line worth of instructions.

In one embodiment, the history based cache line target address predictor may be implemented as a two-level adaptive predictor having at a cache line target history storage 120 a first level and a cache line target history predictor 124 at a second level.

The history based cache line target address predictor includes the cache line target history storage 120. As will be explained in further detail below, the cache line target history storage is operable to store a cache line target history (e.g., a bit in the storage and having a value of either 0 or 1) for each of multiple most recent corresponding cache lines. Each cache line target history may be operable to indicate whether the corresponding cache line had a sequential cache line target or a non-sequential cache line target. For example, the cache line target history may have a first bit value (e.g., 0) if the corresponding cache line had a sequential cache line target, or a second bit value (e.g., 1) if the corresponding cache line had a non-sequential cache line target.

The history based cache line target address predictor also includes a cache line target history predictor 124 coupled with the cache line target history storage 120. The cache line target history predictor is operable to output a prediction of whether the next cache line address 118 to be prefetched is a sequential cache line address or a non-sequential cache line address, based at least in part on the cache line target history.

To avoid obscuring the description, a simplistic processor has been shown and described. It will be appreciated that the processor will include other well-known components, whose description is not necessary for understanding the present disclosure. For example, the processor may also include a decoder, an execution unit, a commit unit, a branch prediction unit, a branch resolution unit, etc.

Figure 2:
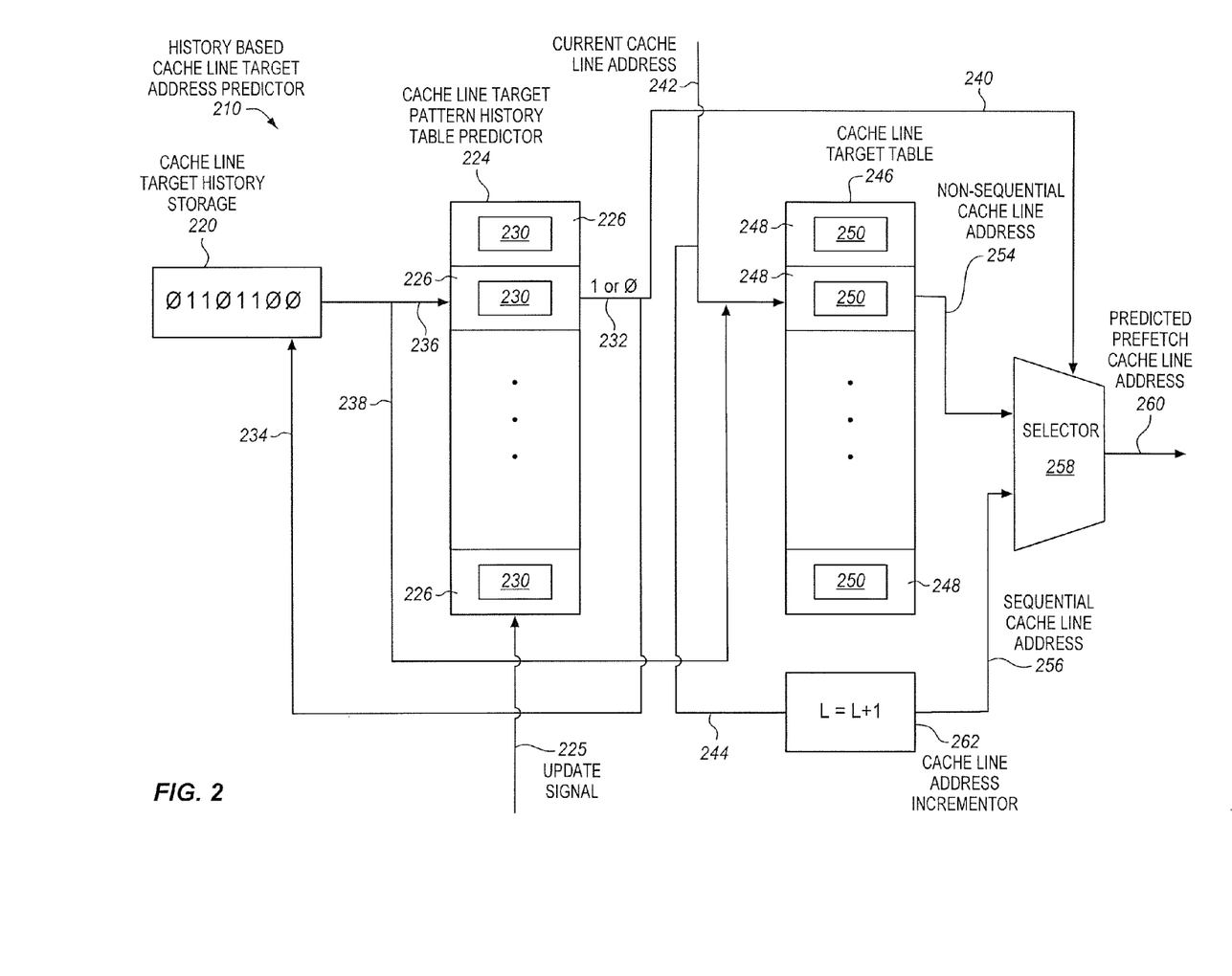
FIG. 2 is a block diagram of an embodiment of a history based cache line target address predictor.

FIG. 2 is a block diagram of an embodiment of a history based cache line target address predictor 210. In one or more embodiments, the prefetch cache line predictor 210 may be included in, or otherwise coupled with, the instruction prefetcher 108 or processor 100 of FIG. 1, or one similar. Alternatively, the prefetch cache line predictor 210 may be included in, or otherwise coupled with, an entirely different instruction prefetcher or processor than those of FIG. 1.

The history based cache line target address predictor 210 includes a cache line target history storage 220. The cache line target history storage may be operable to store a cache line target history for each of multiple most recent corresponding cache lines. The cache line target history storage may represent a register or a plurality of discrete bit storage locations or other storage location(s) or storage that is operable to store a history of whether individual cache lines in a set of recent prior cache lines had sequential or non-sequential cache line targets. In one embodiment, the cache line target history storage may be implemented as an m-bit shift register that is operable to store m-bit pattern history, where m is an integer typically ranging from about 4 to about 16, often from about 4 to about 10, and in some cases from about 6 to about 10. In the illustration, an example 8-bit pattern history, namely "01101100," is shown in an example 8-bit shift register. Each of the m-bits may correspond to a respective one of m prior cache lines and store or represent a history for that cache line. The most significant bit (MSB) (which as viewed is the leftmost bit) may correspond to the oldest prior cache line, whereas the least significant bit (LSB) (which as viewed is the rightmost bit) may correspond to the youngest prior cache line. When a new cache line is to represented in the cache line target history storage, a bit corresponding to that cache line may be shifted into the LSB (which as viewed is the rightmost bit) of the shift register and the MSB (which as viewed is the leftmost bit) of the shift register may be shifted out. Each cache line target history or bit may be operable to indicate, or recognized by the processor as indicating, whether the corresponding cache line had a sequential cache line target or a non-sequential cache line target. In one embodiment, the cache line target history storage 220 may represent a global cache line target history storage where the same cache line target history storage is used for all of the cache line references, rather than different history storages being used for different subsets of the cache line references.

Each of the m-bits in the cache line target history storage 220, or global cache line history storage 220, may indicate whether the corresponding cache line had a sequential or non-sequential cache line target. That is, each bit may store a history of sequential versus non-sequential cache line target behavior for that corresponding cache line. According to one convention, a bit value of 1 may be used to indicate that the corresponding cache line had a non-sequential cache line target, whereas a bit value of 0 may be used to indicate that the corresponding cache line had a sequential cache line target. For improved clarity, this convention will be adhered to in this description, although it is to be understood that the opposite convention could alternatively be used. According to the adhered to convention, the example 8-bit pattern history "01101100" may indicate that the oldest cache line (which corresponds to the MSB or leftmost bit) had a sequential cache line target, the next-to-oldest cache line (which corresponds to the bit immediately to the right of the MSB) had a non-sequential cache line target, and so on, up to indicating that the youngest cache line (which corresponds to the LSB or rightmost bit) had a sequential cache line target.

In the description above, the cache line target history storage has been described as being used to store cache line target history for cache lines that are executed. In another embodiment, the storage may be used to store and be trained on history of instruction cache misses including whether they are sequential or not.

Referring again to FIG. 2, the history based cache line target address predictor 210 also includes a cache line target pattern history table predictor 224 coupled with the cache line target history storage 220. The cache line target pattern history table predictor 224 is an example embodiment of a cache line target history predictor. The cache line target history predictor may be operable to output a prediction of whether the next cache line address to be prefetched is a sequential cache line address or a non-sequential cache line address, based at least in part on the cache line target history.

The pattern history from the cache line target history storage or global cache line target history storage may be provided over line or path 236 and used to index into the cache line target pattern history table predictor. The cache line target pattern history table predictor has multiple entries 226. In one embodiment, in order to represent all unique values of an m-bit pattern history (which is not required), the cache line target pattern history table predictor may have 2^m entries, each corresponding to a different or unique m-bit pattern history. For example, in the case of an 8-bit pattern history, the cache line target pattern history table predictor may have 256 entries each corresponding to a different one of 256 unique 8-bit pattern histories. In one embodiment, the cache line target pattern history table predictor may be a global cache line target pattern history table predictor that is used for all cache line references, rather than having different tables for different subsets of these cache line references. By way of example, the 8-bit pattern history "01101100" may index into a particular corresponding entry in the table. Recall that the 8-bit pattern history "01101100" may also correspond to a particular cache line.

In one embodiment, each of the entries in the cache line target pattern history table predictor may have a trainable predictor 230 that may be trained based on observed history of cache line targets and used to predict future cache line targets. By way of example, if there are 2^m entries in the table, then there may be 2^m different trainable predictors. Each of the trainable predictor may correspond to a different entry in the table, and each of the trainable predictor may correspond to a different unique m-bit pattern history and its associated cache line. The m-bit pattern history may choose or select a corresponding trainable predictor. The trainable predictor may make a prediction. Advantageously, the prediction is based not only on the current cache line but also on the history of other most recent cache lines (e.g., the m-bit history) that is used to index into the table predictor and select the trainable predictor.

In one or more embodiments, the trainable predictor may be an n-bit saturating counter, where n is an integer often ranging from about one to about five. The n-bit saturating counter may be used to keep a saturating or non-wrapping count. The count may represent, reflect, or indicate whether the corresponding pattern history (e.g., the 8-bit pattern history "01101100") and/or the corresponding cache line has recently been observed to have more sequential or more non-sequential cache line targets. The count may be updated or adjusted (e.g., incremented or decremented) when it is later known or determined (e.g., from the eventual execution path) that the cache line target for the particular cache line corresponding to the n-bit counter is either sequential or non-sequential. According to one possible convention, the count may be incremented or increased when it is determined that the cache line target is non-sequential, whereas the count may be decremented or decreased when it is determined that the cache line target is sequential. For improved clarity, this convention will be adhered to in this description, although it is to be understood that the opposite convention could alternatively be used.

According to such a convention, relatively higher counts may indicate with relatively more predictive likelihood that the cache line corresponding to the counter refers to a non-sequential cache line, whereas relatively lower counts may indicate with relatively more predictive likelihood that the cache line refers to only the next sequential cache line. The saturating count may be a non-wrapping count that may saturate at a maximum or minimum value. In one embodiment, the count of the n-bit counter may be examined and either, a relatively higher count may be used to predict that the cache line corresponding to the n-bit counter references a non-sequential cache line, or a relatively lower count may be used to predict that the cache line corresponding to the n-bit counter references to only a sequential cache line.

Figure 3:
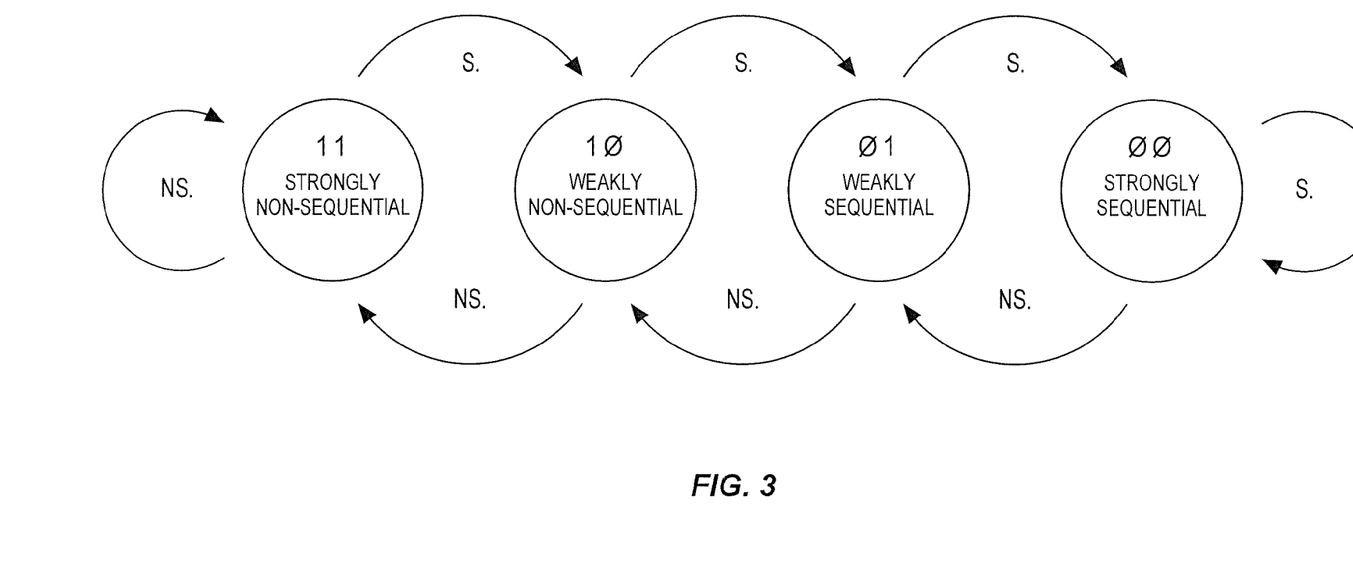
FIG. 3 illustrates a state diagram of an embodiment of a 2-bit saturating counter suitable for a cache line target pattern history table predictor.

In one embodiment, the n-bit saturating counter may be a 2-bit saturating counter. FIG. 3 illustrates a state diagram of an embodiment of a 2-bit saturating counter. The state machine has four states, namely "00," "01," "10," and "11." In binary, "00" corresponds to the value 0, "01" corresponds to the value 1, "10" corresponds to the value 2, and "11" corresponds to the value 3. According to the adhered to convention discussed immediately above, the state "00" may represent or predict strongly sequential cache line target, the state "01" may represent or predict weakly sequential cache line target, the state "10" may represent or predict weakly non-sequential cache line target, and the state "11" may represent or predict strongly non-sequential cache line target.

When the cache line target of the cache line corresponding to the 2-bit counter is evaluated (e.g., from the eventual execution path), the corresponding 2-bit counter may be updated. According to the adhered to convention, the 2-bit counter may be incremented or increased by one when the cache line target is non-sequential (N.S.), or the 2-bit counter may be decremented or decreased by one when the cache line target is sequential (S). Incrementing or decrementing the counter may be state transitions. For example, the counter may transition from a starting state "00" to an updated state "01" in the event of a non-sequential cache line target being determined, or as another example the counter may transition from a starting state "10" to an updated state "01" in the event of a sequential cache line target being determined. The 2-bit counter is saturating. The count may max-out at the state "11" and from there only be decremented in the event of a sequential (S) cache line target being determined, or the count may min-out at the state "00" and from there only be incremented in the event of a non-sequential (N.S.) cache line target being determined.

There are various different ways to update the counters or other trainable predictors. As shown, in one embodiment, an update signal 225 may be provided to the cache line target pattern history table predictor 224 to update the counters or other trainable predictors. In one embodiment, the update signal may be, or be derived from, a branch prediction signal provided by branch prediction logic. This may provide quick updates to the counters, but may be in error and may need to be corrected when the branch prediction is resolved. In another embodiment, the update signal may be, or be derived from, a branch resolution signal provided by branch resolution logic. Other signals from or derived from other logic that monitors instruction execution, retirement, or commitment, are also suitable. In one aspect, the signal may be provided from the back end of the processor. On a misprediction, the information of the history based predictor may be changed to match the correctly executed stream. One example approach to repair the history state is through monitoring change in instruction flow (e.g., as reflected in a branch prediction unit), which results in a control flow target that does not fall in the same or next sequential cache line.

In one embodiment, the count or state of the 2-bit counter may be examined. According to the adhered to convention, a higher half of the counts or states of the counter may be used to predict that the cache line corresponding to the n-bit counter references a non-sequential cache line, or a lower half of the counts or states of the counter may be used to predict that the cache line corresponding to the n-bit counter references only a sequential cache line. For example, the two bit counter values or states "11" and "10" may be used to predict that the cache line corresponding to the n-bit counter references a non-sequential cache line, whereas the two bit counter values or states "01" and "00" may be used to predict that the cache line corresponding to the n-bit counter references only a sequential cache line.

In some cases, rather than looking at the whole n-bit counter, only a most significant portion or subset of the n-bits may be examined. For example, in the case of the 2-bit counter, only the most significant bit of the 2-bit counter may be examined. The most significant bit of the 2-bit counter may have a value of either 0 or 1. If the MSB of the 2-bit counter has a value of 0 (i.e., the 2-bit counter has the state "00" or "01"), then the prediction may be that the target cache line is sequential. Alternatively, if the MSB of the 2-bit counter has a value of 1 (i.e., the 2-bit counter has the state "11" or "10"), then the prediction may be that the target cache line is non-sequential.

In one embodiment, if the n-bit counter or other trainable predictor predicts that the cache line references a non-sequential cache line, then the table predictor 224 may output a binary 1. Again, this is according to one possible convention, and is not required. Alternatively, if the n-bit counter or other trainable predictor predicts that the cache line references a sequential cache line, then the table predictor 224 may output a binary 0. The bit value of 0 or 1 output from the table predictor 224 may be provided over line or path 234 and combined with the cache line target history storage 220. For example, the 0 or 1 may be shifted into the LSB of the shift register, or otherwise concatenated with the cache line target history. For example, assuming the output of the table was a binary 1, then the aforementioned example 8-bit cache line target history "01101100" may be updated or changed to "11011001," where the LSB (the rightmost bit as viewed) has been added, the former MSB has been shifted out, and all intermediate bits have been shifted by one bit (to the left as viewed). This updated cache line target history "11011001" may then be used to index into the table predictor 224 substantially as previously described. This may allow the predictor to run farther ahead of execution using the predicted history and then if subsequently execution reveals the predicted history is incorrect it may be adjusted.

Referring again to FIG. 2, the history based cache line target address predictor 210 also includes a cache line target table 246. The cache line target table may be operable to store non-sequential cache line targets for cache lines that have been previously encountered and that had a non-sequential cache line target. The cache line target table has multiple entries 248. In one aspect, each entry of the cache line target table may potentially have a non-sequential cache line target address 250.

A current cache line address 242 may be provided to the cache line target table and may be used to index into or select an entry in the cache line target table. In one embodiment, the cache line target history (e.g., the 8-bit example history "01101100") may also be provided to the cache line target table over a line or path 238. In one embodiment, the current cache line address 242 and the cache line target history may together be used to index into the cache line target table and select an entry. Advantageously, using the cache line target history may extend the benefits of the cache line target history to the cache line target history table. In one embodiment, a hash may be taken of the current cache line address 242 and the cache line target history with a hash function, and this hash may be used to index into the cache line target table. For example, in one aspect, an exclusive OR (XOR) may be taken of the current cache line address 242 and the cache line target history, where the XOR represents an example embodiment of the hash function, and this XOR may be used to index into the cache line target table. Advantageously, using the XOR or other hash to index into the table may help to improve the utilization of the entries in the table. Another suitable hash function is a concatenation of the bits of the cache line address and the cache line history. Other more complicated hashes are also suitable. When the non-sequential cache line target address exists in the cache line target table at the entry indexed or selected it may be output from the cache line target table. The non-sequential cache line addresses are non-sequential relative to the current cache line address (e.g., there are one or more intervening cache line addresses). If the non-sequential cache line target address does not exist in the table, then in one aspect no prefetch may be issued, to help avoid cache pollution, although the scope of the invention is not limited in this regard. Alternatively, a sequential prefetch may optionally be issued.

In one embodiment, the cache line target table may be trained when a non-sequential cache line is encountered and the target cache line misses in the cache, although this is not required. Storing information in the cache line target table selectively for only those lines that miss in the cache may help to reduce the size of the cache line target table relative to the size it would need to be in order to store information for all executed cache lines. Alternatively, information may be stored for all executed lines that have a non-sequential cache line. Referring again to FIG. 2, the history based cache line target address predictor also includes a multiplexor (MUX) or other selector 258. The MUX represents one suitable selection circuit, selection logic, or selector, although other selection circuits, logic, selectors, or substitutes for the MUX known in the arts are also suitable. The MUX or other selector is coupled by a line or path 254 to receive as a first input the non-sequential cache line target address output from the cache line target table 246. The MUX or other selector is coupled by a line or path 256 to receive as a second input a sequential cache line address output from cache line address incrementer 262. The cache line address incrementer is coupled by a line or path 244 to receive the current cache line address 242 (e.g., L), may increment the current cache line address to a next sequential cache line address (e.g., L+1) that is sequential relative to the current cache line address, and may provide the next sequential cache line address to the MUX or other selector.

The MUX or other selector is also coupled by a line or path 240 to receive as a control input the prediction 232 output from the table predictor 224. The MUX is operable to select one of either the sequential cache line address 256 or the non-sequential cache line address 254 according to or based on the prediction 232 output from the table predictor 224. For example, according to the adhered to convention, the MUX or other selector may select the non-sequential cache line target address 254 if the output from the table predictor 224 is a binary 1, or may select the sequential cache line target address 256 if the output from the table predictor 224 is a binary 0. The MUX or other selector may output the predicted cache line fetch address 260.

A method of one embodiment may include, the prefetch cache line address predictor being queried or asked for a next cache line address to be prefetched. The prefetch cache line address predictor may predict the next cache line address to be prefetched. Predicting the next cache line address to be prefetched may include the prefetch cache line address predictor using cache line target history information to determine whether to predict a sequential or non-sequential cache line target address. If the cache line target history information indicates to predict the sequential cache line target address, then the sequential cache line target address may be computed by adding the line size to the current cache line address. The sequential cache line target address may then be output and a prefetch for this cache line target address may be issued. Alternatively, if the cache line target history information indicates to predict the non-sequential cache line target address, then the cache line target table may be checked to determine if a non-sequential cache line target address is available for the current cache line. If so, then the non-sequential cache line target address may be output and a prefetch for this cache line target address may be issued. If not, then in one aspect no prefetch may be issued, to help avoid cache pollution, although the scope of the invention is not limited in this regard.

Advantageously, using the cache line target history information or global cache line target history information may help to improve the accuracy of prediction, especially when the path of instruction flow changes. By itself, the cache line target address from the cache line target table may be incorrect if the path of instruction flow changes. However, using the cache line target history information (e.g. through the cache line target history and the cache line target pattern history table predictor) may help to improve the prediction, over just the prediction of the cache line target table alone. The cache line target history information may be used to temper the prediction according to the path of instruction flow. Improving the accuracy of the prediction may help to reduce the number of useless prefetches issued. This may help to reduce cache pollution and reduce power consumption spent on unnecessary prefetches. This may also help to allow the instruction prefetcher to run farther ahead of the executed instruction stream. Due to the increased accuracy of the predictions, more of the prefetched instructions will actually be needed for execution, and rather than the instruction prefetcher needing to back up and fetch replacement instructions, it may run farther ahead of the executed instruction stream.

Figure 4:
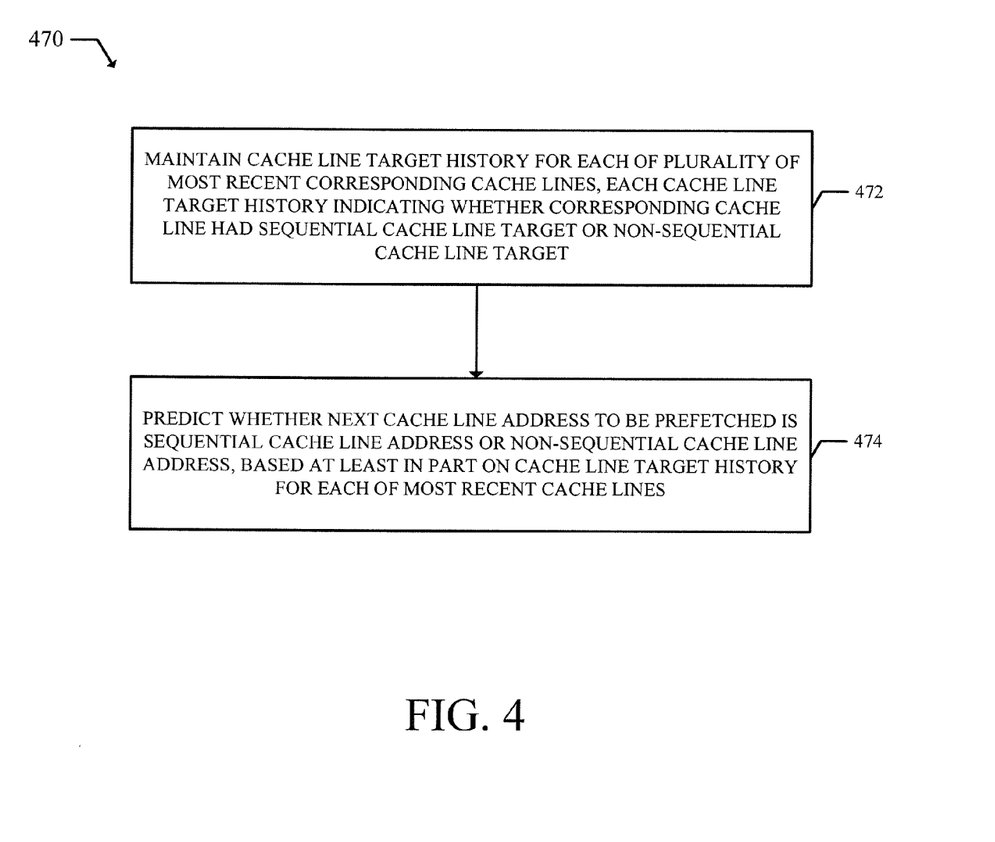
FIG. 4 is a block flow diagram of an embodiment of a method of predicting whether a next cache line address to be prefetched is a sequential cache line address or a non-sequential cache line address.

FIG. 4 is a block flow diagram of an embodiment of a method 470 of predicting whether a next cache line address to be prefetched is a sequential cache line address or a non-sequential cache line address.

The method includes maintaining a cache line target history for each of a plurality of most recent corresponding cache lines, at block 472. Each cache line target history may indicate whether the corresponding cache line had a sequential cache line target or a non-sequential cache line target. In one embodiment, the cache line target histories may represent global cache line target histories that are maintained in a shift register or other cache line target history storage. In one embodiment, cache line target history may be maintained for each of from four to ten of the most recent cache lines.

The method also includes predicting whether the next cache line address to be prefetched is a sequential cache line address or a non-sequential cache line address, based at least in part on the cache line target history for each of the most recent cache lines, at block 474. In one embodiment, the prediction may include selecting one of a plurality of n-bit saturating counters that corresponds to the cache line target history for each of the most recent cache lines, and predicting whether the next cache line address to be prefetched is the sequential cache line address or the non-sequential cache line address based on a count of the saturating counter.

Figure 5:
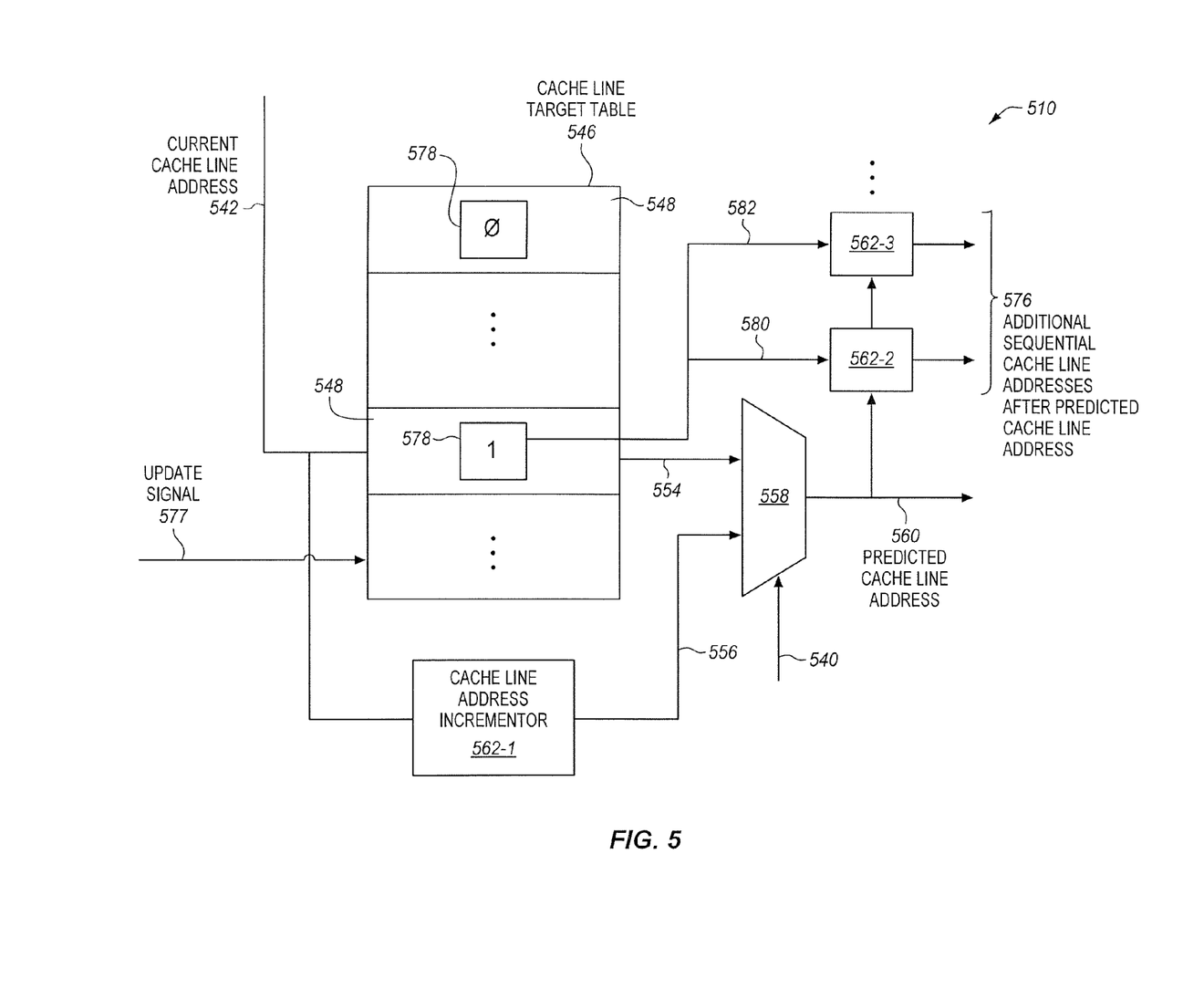
FIG. 5 is a block diagram of an embodiment of a portion of a cache line target address predictor having a cache line target table having next N-lines prefetch ahead control.

FIG. 5 is a block diagram of an embodiment of a portion of a cache line target address predictor 510 having a cache line target table 546 having next N-lines prefetch ahead control 578. In one embodiment, the portion of the cache line target address predictor 510 may be incorporated into the history based cache line target address predictor 210 of FIG. 2. Advantageously, this may allow the cache line target address predictor to take advantage of the history based prediction previously described above. However, the cache line target table 546 and the next N-lines prefetch ahead control 578 may be alternatively be used separately from the history based prediction previously described above in conjunction with FIG. 2. In other words, the cache line target table 546 and the next N-lines prefetch ahead control 578 may be included in a cache line target address predictor that need not include the cache line target history storage 220 or the cache line target pattern history table predictor 224.

The cache line target address predictor 510 includes the cache line target table 546, a cache line address incrementer 562-1, and a MUX or other selector 558. Aside from the characteristics of these components specifically discussed below, these components may be similar to the correspondingly named components of FIG. 2. To avoid obscuring the description, all of these similarities will not be unnecessarily repeated, but rather the discussion below will tend to focus on the different and/or additional characteristics of the cache line target address predictor 510 of FIG. 5.

A current cache line address 542 may be provided to the cache line target table 546. The cache line target table has a plurality of entries 546. At least some of the entries may store a non-sequential cache line target as previously described. The current cache line address (and in one embodiment also a cache line target history as discussed above for FIG. 2) may be used to index into the cache line target table and select a non-sequential target cache line 554. The cache line address incrementer 562-1 may increment the current cache line address to generate a next sequential cache line address 556. The selector 540 may select between the sequential cache line address 556 and the non-sequential target cache line 554 based on control 540 (which in one embodiment be provided by a cache line target pattern history table predictor as discussed above for FIG. 2). The selector 540 may output a predicted cache line address 560.

In one embodiment, the selector 540 may select or output the non-sequential cache line target 554. Prefetching tends to be more useful when the prefetched line is present in the cache by the time the fetch unit tries to access it. Prefetching only the single non-sequential cache line target for the current cache line address may have limited benefit in certain situations, such as if the non-sequential cache line target hits in the cache and the next cache line target is needed soon thereafter. If the next target line is only present in memory, then significant delay may be encountered waiting for this next target lien, since memory latency tends to be quite significant (e.g., from around a hundred to hundreds of cycles).

One approach is to also prefetch one or more additional cache lines that are sequentially after the predicted or output non-sequential cache line target 554 up to a so called N-line prefetch ahead distance, where N is an integer from 1 to any reasonable number, commonly from about 1 to 6. In some situations, for example if the non-sequential cache line target 554 has at most short control transfer instructions, such additional cache line prefetching tends to be advantageous. For example, it may help to avoid stalls waiting for the additional cache lines within the N-line prefetch ahead distance to be accessed from memory. However, in other situations, for example if the non-sequential cache line target 554 has a longer control transfer instruction that refers to a non-sequential cache line target that is farther removed from the non-sequential cache line target 554 than the N-line prefetch ahead distance, then this approach may waste prefetches, power, and contribute to cache pollution.

Referring again to FIG. 5, the cache line target address predictor 510 has next N-lines prefetch ahead control 578 in the cache line target table 546. As shown in the illustrated embodiment, each entry in the cache line target table 546 may have a corresponding next N-lines prefetch ahead control 578. In one embodiment, each next N-lines prefetch ahead control 578 may include one or more bits. Each next N-lines prefetch ahead control 578 may control whether or not a next N-lines prefetch ahead operation is performed for the corresponding entry or corresponding non-sequential target cache line in the table. By way of example, according to one possible convention, a binary 1 may indicate that the next N-lines prefetch ahead operation is enabled, whereas a binary 0 may indicate that the next N-lines prefetch ahead operation is disabled or throttled for the corresponding entry or corresponding non-sequential target cache line in the table. Referring to FIG. 5, for the table entry having a binary 1, this binary 1 may control 580, 582 a plurality of cache line address incrementers 562-2, 562-3 to increment the non-sequential cache line target 554 and output prefetches for one or more next N-line cache line addresses that are sequential cache line addresses after the non-sequential cache line target 554. In the illustrated embodiment, the next N-lines prefetch ahead control 578 is provided within the cache line target table 546. In an alternate embodiment, the next N-lines prefetch ahead control 578 could be placed in a separate table or otherwise separated from the cache line target table 546.

Advantageously, the next N-lines prefetch ahead control 578 may provide look-ahead path prediction to improve timeliness of prefetches by associating cache line addresses with non-sequential cache line targets and also associated information regarding the benefit of aggressively prefetching beyond the non-sequential cache line targets. The instruction flow pattern tends to be predictable and correspondingly the cache line flow pattern tends to be predictable. The next N-lines prefetch ahead control 578 may represent a measure of the confidence of the usefulness of prefetching beyond the given non-sequential cache line target as a 'look-ahead' filter for prefetches.

Advantageously, in situations where the non-sequential cache line target 554 has a long control transfer instruction that refers to a non-sequential cache line target that is farther removed from the non-sequential cache line target 554 than the N-line prefetch ahead distance, in some cases the aggressive prefetching may be throttled or disabled, which may help to reduce unnecessary prefetches, reduce power, and reduce cache pollution. Instead, the instruction prefetcher after prefetching the non-sequential target cache line 554, would again probe the target table for the appropriate new target. Using the next N-lines prefetch ahead control 578 may help to further increase the likelihood that useful cache lines are fetched into the cache before they are required, which may help to reduce the instruction miss rate and decrease pollution in the cache.

The next N-lines prefetch ahead control 578 corresponding to each non-sequential target cache line in the table may be changed or updated based on whether or not next N-lines prefetch ahead was useful in the past or is otherwise predicted to be useful in the future. There are various different ways to update the next N-lines prefetch ahead control 578. As shown, in one embodiment, an update signal 577 may be provided to the cache line target table 546 to update the control. In one embodiment, the update signal may be, or be derived from, a branch prediction signal provided by branch prediction logic. This may provide quick updates to the counters, but may be in error and may need to be corrected when the branch prediction is resolved. In another embodiment, the update signal may be, or be derived from, a branch resolution signal provided by branch resolution logic. Other signals from or derived from other logic that monitors instruction execution, retirement, or commitment, are also suitable. In one aspect, the signal may be provided from the back end of the processor.

Figure 6:
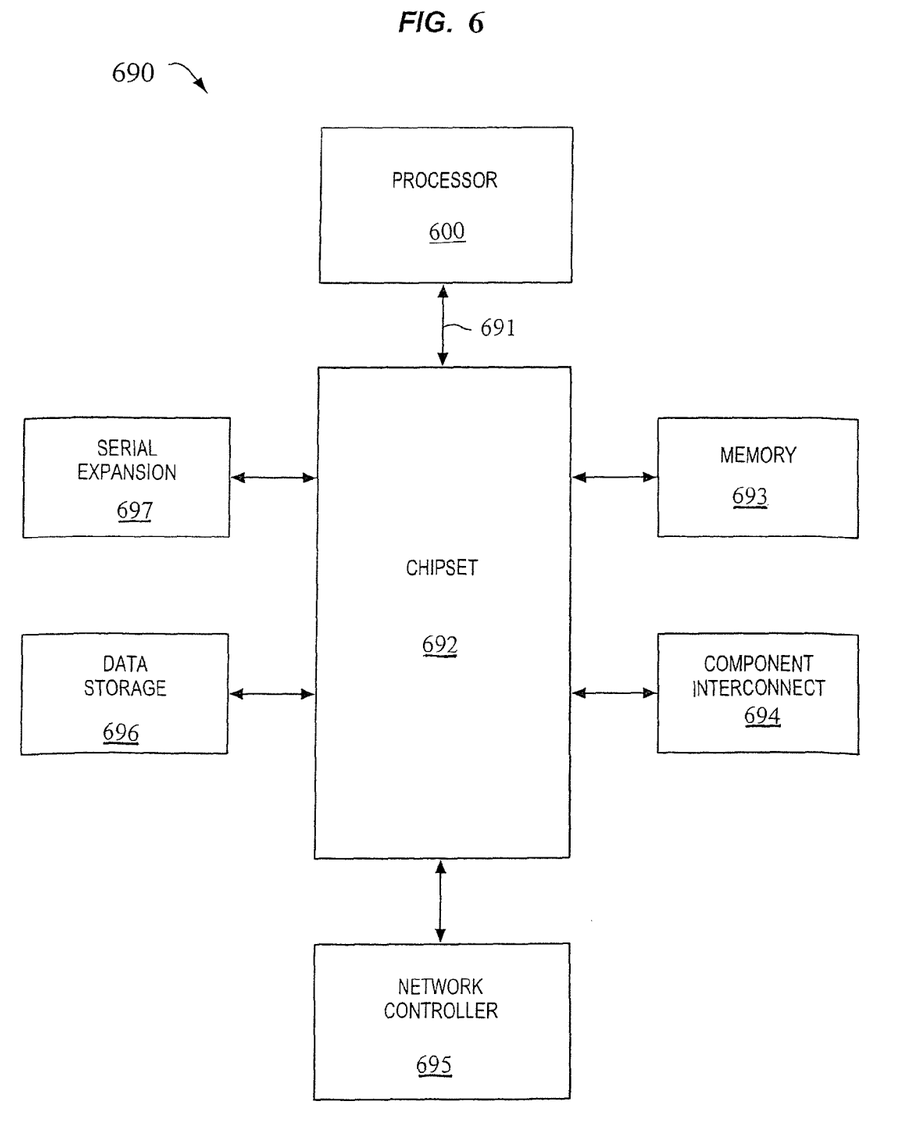
FIG. 6 is a block diagram of an example embodiment of a computer system or electronic device suitable for incorporating a processor of one embodiment.

Still other embodiments pertain to a system (e.g., a computer system or other electronic device) having one or more processors as disclosed herein and/or performing a method as disclosed herein. FIG. 6 is a block diagram of an example embodiment of a suitable computer system or electronic device 690.

The computer system includes a processor 600. The processor may have one or more cores. In the case of a multiple core processor, the multiple cores may be monolithically integrated on a single integrated circuit (IC) chip or die. In one aspect, each core may include at least one execution unit and at least one cache.

The processor is coupled to a chipset 692 via a bus (e.g., a front side bus) or other interconnect 691. The interconnect may be used to transmit data signals between the processor and other components in the system via the chipset.

A memory 693 is coupled to the chipset. In various embodiments, the memory may include a random access memory (RAM). Dynamic RAM (DRAM) is an example of a type of RAM used in some but not all computer systems.

A component interconnect 694 is also coupled with the chipset. In one or more embodiments, the component interconnect may include one or more peripheral component interconnect express (PCIe) interfaces. The component interconnect may allow other components to be coupled to the rest of the system through the chipset.

A network controller 695 is also coupled to the chipset. The network controller may allow the system to be coupled with a network.

A data storage 696 is coupled to the chipset. In various embodiments, the data storage may include a hard disk drive, a floppy disk drive, a CD-ROM device, a flash memory device, a dynamic random access memory (DRAM), or the like, or a combination thereof.

A serial expansion port 697 is also coupled with the chipset. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the chipset include, but are not limited to, an audio controller, a wireless transceiver, and a user input device (e.g., a keyboard, mouse).

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. Other system designs and configurations known in the arts for laptops, desktops, handheld PCs, personal digital assistants, engineering workstations, servers, network devices, network hubs, switches, video game devices, set-top boxes, and various other electronic devices having processors, are also suitable. In some cases, the systems may have multiple processors.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It will also be appreciated, by one skilled in the art, that modifications may be made to the embodiments disclosed herein, such as, for example, to the sizes, configurations, forms, functions, and manner of use, of the components of the embodiments. All equivalent relationships to those illustrated in the drawings and described in the specification are encompassed within embodiments of the invention.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus comprising:
a bus interface unit;
an instruction prefetcher coupled with the bus interface unit; and
a prefetch cache line address predictor coupled with the instruction prefetcher, the prefetch cache line address predictor to receive a cache line address and to predict a next cache line address to be prefetched, wherein the next cache line address is to indicate a cache line having at least 64-bytes of instructions, the prefetch cache line address predictor having:
a cache line target history storage, the cache line target history storage to store a cache line target history for each of a plurality of most recent corresponding cache lines, each cache line target history to indicate whether the corresponding cache line had a sequential cache line target or a non-sequential cache line target; and
cache line target history predictor coupled with the cache line target history storage, the cache line target history predictor to predict whether the next cache line address to be prefetched is a sequential cache line address or a non-sequential cache line address, based at least in part on the cache line target history for each of the most recent cache lines.

2. The apparatus of claim 1, wherein the cache line target history storage is to store the cache line target history for each of from four to ten of the most recent corresponding cache lines.

3. The apparatus of claim 1, wherein the cache line target history storage comprises a global cache line target history storage.

4. The apparatus of claim 1, wherein the cache line target history predictor comprises a cache line target pattern history table predictor, the cache line target pattern history table predictor having a plurality of entries each having a corresponding trainable predictor, wherein the cache line target history is to index into the cache line target pattern history table predictor to select one of the entries and the corresponding trainable predictor.

5. The apparatus of claim 4, wherein each trainable predictor comprises an n-bit saturating counter, where n is an integer ranging from one to five.

6. The apparatus of claim 1, further comprising:
a cache line target table having a plurality of entries, wherein a current cache line address is to index into the cache line target table to select one of the entries and a corresponding non-sequential cache line target address that is non-sequential relative to the current cache line address;

a cache line address incrementer to receive the current cache line address and increment the current cache line address to a sequential cache line address that is sequential relative to the current cache line address; and a selector coupled with the cache line target table to receive the non-sequential cache line target address, coupled with the cache line address incrementer to receive the sequential cache line address, and coupled with the cache line target history predictor to receive the prediction, the selector to select either the sequential cache line address or the non-sequential cache line address based on the prediction.

7. The apparatus of claim 1, further comprising a cache line target table coupled with the cache line target history storage, in which the cache line target history storage is to provide the cache line target history to the cache line target table and the cache line target history is to be used in part to index into the cache line target table.

8. The apparatus of claim 1, further comprising a cache line target table having a plurality of entries, wherein at least a current cache line address is to index into the cache line target table to select one of the entries and a corresponding non-sequential cache line target address that is non-sequential relative to the current cache line address, and wherein the cache line target table has a next N-lines prefetch ahead control to control whether or not a next N-lines prefetch ahead operation is performed for the corresponding non-sequential cache line target address.

9. The apparatus of claim 1, wherein the cache line target history storage and the cache line target history predictor comprise a two-level adaptive predictor.

10. A method comprising:
maintaining a cache line target history for each of a plurality of most recent corresponding cache lines, each cache line target history indicating whether the corresponding cache line had a sequential cache line target or a non-sequential cache line target, wherein maintaining the cache line target history comprises maintaining a cache line target history for each of from four to ten of the most recent corresponding cache lines; and
predicting whether a next cache line address to be prefetched is a sequential cache line address or a non-sequential cache line address, based at least in part on the cache line target history for each of the most recent cache lines.

11. A method comprising:
maintaining a cache line target history for each of a plurality of most recent corresponding cache lines, each cache line target history indicating whether the corresponding cache line had a sequential cache line target or a non-sequential cache line target; and
predicting whether a next cache line address to be prefetched is a sequential cache line address or a non-sequential cache line address, based at least in part on the cache line target history for each of the most recent cache lines, wherein predicting comprises:
selecting one of a plurality of n-bit saturating counters that corresponds to the cache line target history for each of the most recent cache lines; and
predicting whether the next cache line address to be prefetched is the sequential cache line address or the non-sequential cache line address based on a count of the saturating counter.

12. A system comprising:
a bus;
a dynamic random access memory (DRAM) coupled with the bus; and
a processor coupled with the bus, the processor having:
a prefetch cache line address predictor to receive a cache line address and to predict a next cache line address to be prefetched, wherein the next cache line address is to indicate a cache line having at least 64-bytes of instructions, the prefetch cache line address predictor having:
a cache line target history storage, the cache line target history storage to store a cache line target history for each of a plurality of most recent corresponding cache lines, each cache line target history to indicate whether the corresponding cache line had a sequential cache line target or a non-sequential cache line target; and
cache line target history predictor coupled with the cache line target history storage, the cache line target history predictor to predict whether the next cache line address to be prefetched is a sequential cache line address or a non-sequential cache line address, based at least in part on the cache line target history for each of the most recent cache lines.

13. The system of claim 12, wherein the cache line target history predictor comprises a cache line target pattern history table predictor, the cache line target pattern history table predictor having a plurality of entries each having a corresponding trainable predictor, wherein the cache line target history is to index into the cache line target pattern history table predictor to select one of the entries and the corresponding trainable predictor.

14. The system of claim 12, wherein the cache line target history storage comprises a global cache line target history storage, and wherein the cache line target history storage is to store the cache line target history for each of from four to ten of the most recent corresponding cache lines.

15. The system of claim 12, wherein the prefetch cache line address predictor further comprises:
a cache line target table having a plurality of entries, wherein a current cache line address is to index into the cache line target table to select one of the entries and a corresponding non-sequential cache line target address that is non-sequential relative to the current cache line address;
a cache line address incrementer to receive the current cache line address and increment the current cache line address to a sequential cache line address that is sequential relative to the current cache line address; and
a selector coupled with the cache line target table to receive the non-sequential cache line target address, coupled with the cache line address incrementer to receive the sequential cache line address, and coupled with the cache line target history predictor to receive the prediction, the selector to select either the sequential cache line address or the non-sequential cache line address based on the prediction.

16. The system of claim 12, further comprising a cache line target table having a plurality of entries, wherein at least a current cache line address is to index into the cache line target table to select one of the entries and a corresponding non-sequential cache line target address that is non-sequential relative to the current cache line address, and wherein the cache line target table has a next N-lines prefetch ahead control to control whether or not a next N-lines prefetch ahead operation is performed for the corresponding non-sequential cache line target address.

* * * * *